Dec. 21, 1926.  
I. FLORMAN  
1,611,180  
SECURING MEANS FOR RADIATOR CAPS  
Filed June 23, 1926
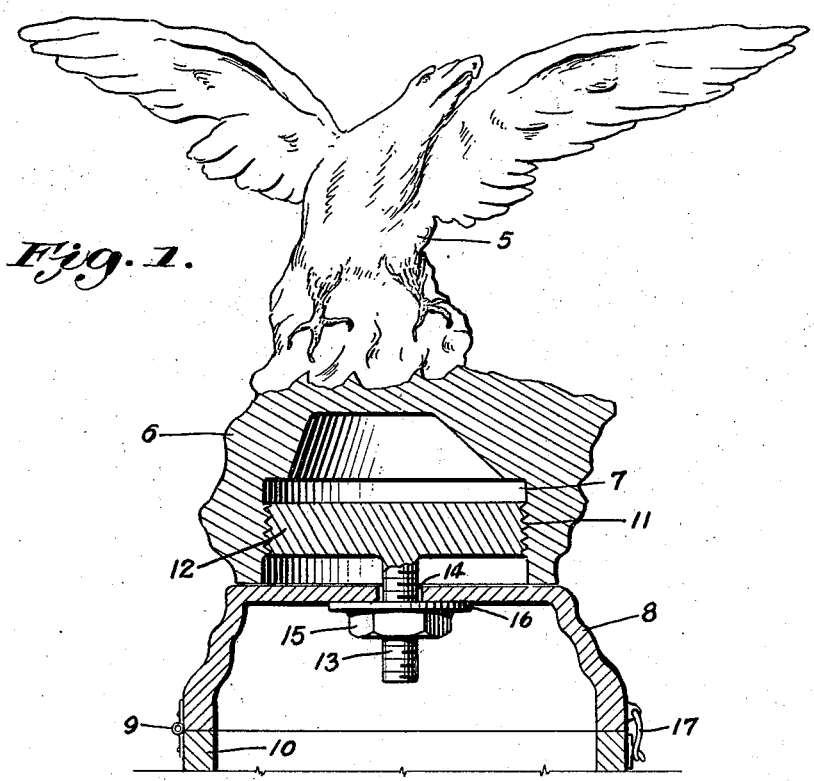
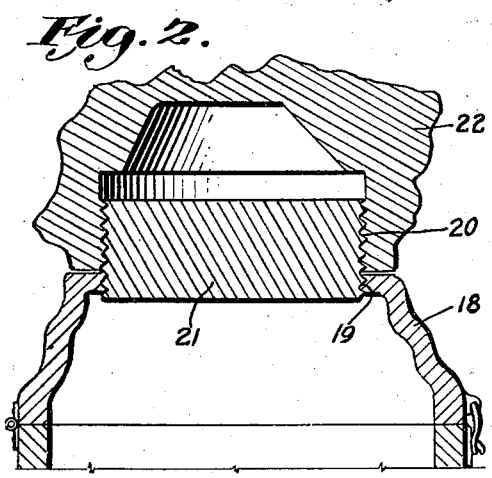
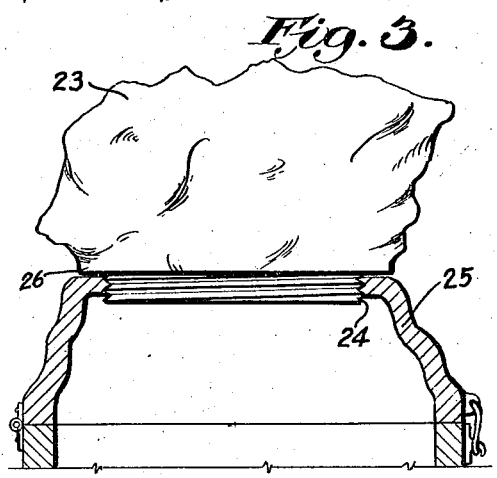
Inventor  
Irving Florman,  
By  
Attorney Patented Dec. 21, 1926.

1,611,180

UNITED STATES PATENT OFFICE.

IRVING FLORMAN, OF NEW YORK, N. Y.

SECURING MEANS FOR RADIATOR CAPS.

Application filed June 23, 1926. Serial No. 118,047.

In ornaments for automobile radiator caps as usually manufactured, the base of the ornament is threaded to engage the radiator inlet directly, either externally or internally, so that in order to fill the radiator the ornament must be unscrewed from the inlet. This operation requires some time, and the arrangement has the further disadvantage that no practical locking means can be provided to protect the ornament from theft.

It is the object of this invention to eliminate these disadvantages by providing a hinged cap which is adapted to receive an ornament, which ornament may be secured thereto in a positive manner.

These and other features of the invention will appear from the following description when read in connection with the accompanying drawings, in which:

Fig. 1 shows an embodiment of the invention, partly in section;

Fig. 2 shows a modification thereof; and

Fig. 3 shows a further modification.

Referring to Fig. 1, 5 represents an ornament of any suitable design, having a base 6 and an internal bore 7. The ornament is secured, by means described below, to a radiator cap 8 hinged at 9 to the radiator inlet 10. Bore 7 is threaded at 11 to receive a correspondingly threaded disk 12. Disk 12 carries a depending bolt 13, which passes through an aperture 14 in the hinged cap and is secured in place by a nut 15 and lock washer 16.

I have shown disk 12 and bolt 13 as formed integral with each other, but they may instead be formed separately and attached together by passing the bolt through an aperture in the disk and soldering or otherwise permanently securing the two together.

In order to adapt the hinged cap to receive the ornament, the aperture 14 is drilled in the top of the cap. The disk 12 may then be screwed into place in bore 7, bolt 13 inserted in aperture 14 and washer 16, and nut 15 put in place on bolt 13. The cap is held in place by any suitable latch 17 which may be unfastened to permit filling the radiator. Aperture 14 is shown as a smooth bore, but it may, if desired, be threaded to engage the threads of bolt 13.

In the construction shown in Fig. 2, the cap 18 is tapped at 19 to the same diameter as the threaded bore 20. A disk 21 engages the threads of the bore and of the cap in order to hold the ornament 22 in place.

A further modification is shown in Fig. 3 wherein the base of the ornament 23 is externally threaded at 24 to directly engage the threads of an aperture in the hinged cap 25. A shoulder 26 is formed on the base to engage the cap 25.

As a further modification, the cap may be externally threaded to engage an internally threaded ornament of the type shown in Figs. 1 and 2.

In all the foregoing modifications, it is preferable to solder, batter, or otherwise permanently secure the interengaging threads between the ornament and the disk, between the disk and the cap, and between the ornament and the cap. In the modification shown in Fig. 1, bolt 13 may be soldered or battered to prevent the removal of nut 15. The purpose of so securing the various elements is, of course, to prevent theft of the ornament.

Having described my invention, what I claim as new and desire to secure by Letters Patent of the United States is:

1. In combination, a radiator cap having an aperture in its top, an interiorly threaded ornament, and a device for securing said ornament to said radiator cap, said device comprising a small-diameter portion adapted to be disposed within said aperture, and a large-diameter portion exteriorly threaded to engage the interior threads of the ornament.

2. A device for securing an interiorly threaded ornament to an apertured radiator cap, comprising a small-diameter portion adapted to be disposed within the aperture of said cap, and a large-diameter portion exteriorly threaded to engage the interior threads of said ornament.

In testimony whereof I set my signature.

IRVING FLORMAN.